United States Patent
Peng et al.

(10) Patent No.: US 11,862,806 B2
(45) Date of Patent: Jan. 2, 2024

(54) BUTTON CELL AND ELECTRONIC DEVICE

(71) Applicant: Zhuhai CosMX Battery Co., Ltd., Zhuhai (CN)

(72) Inventors: Ning Peng, Zhuhai (CN); Bin Xie, Zhuhai (CN)

(73) Assignee: ZHUHAI COSMX BATTERY CO., LTD.

( * ) Notice: Subject to any disclaimer, the term of this patent is extended or adjusted under 35 U.S.C. 154(b) by 0 days.

(21) Appl. No.: 17/127,252

(22) Filed: Dec. 18, 2020

(65) Prior Publication Data
US 2021/0384576 A1 Dec. 9, 2021

(30) Foreign Application Priority Data

Jun. 3, 2020 (CN) .......... 202010496417.7
Jul. 8, 2020 (CN) .......... 202021331670.9

(51) Int. Cl.
*H01M 50/186* (2021.01)
*H01M 50/109* (2021.01)
(Continued)

(52) U.S. Cl.
CPC ....... *H01M 50/186* (2021.01); *H01M 50/109* (2021.01); *H01M 50/153* (2021.01);
(Continued)

(58) Field of Classification Search
CPC .. H01M 50/10; H01M 50/102; H01M 50/107; H01M 50/109; H01M 50/147;
(Continued)

(56) References Cited

U.S. PATENT DOCUMENTS 7,341,802 B1 3/2008 Ota et al.
7,341,805 B2 3/2008 Ueda et al.
(Continued)

FOREIGN PATENT DOCUMENTS

CN 1134042 A 10/1996
CN 1618140 A 5/2005
(Continued)

OTHER PUBLICATIONS

European Search Report in EP Patent Application No. 20217378.7 dated Jun. 17, 2021.
(Continued)

*Primary Examiner* — Jonathan Crepeau
*Assistant Examiner* — Jacob Buchanan
(74) *Attorney, Agent, or Firm* — Dilworth IP, LLC (57) ABSTRACT

The present disclosure provides a button cell and an electronic device. In the button cell, a conductive member covers an opening of a top cover, and the top cover is connected to the conductive member. A cell is placed in an accommodating cavity of a bottom shell. A first tab is welded to an inner bottom wall of the bottom shell, and then the top cover having the conductive member is connected to the bottom shell in a sealed manner, with a second tab on the cell being electrically connected to the conductive member. Finally, an electrolyte solution is injected into the accommodating cavity. After the electrolyte solution is injected, a sealing member covers the liquid injection port, and the sealing member is connected to the liquid injection port in a sealed manner.

19 Claims, 9 Drawing Sheets

(51) Int. Cl.
  *H01M 50/636* (2021.01)
  *H01M 50/153* (2021.01)
  *H01M 50/533* (2021.01)
  *H01M 50/559* (2021.01)
  *H01M 50/181* (2021.01)

(52) U.S. Cl.
  CPC ....... *H01M 50/533* (2021.01); *H01M 50/559* (2021.01); *H01M 50/636* (2021.01); *H01M 50/181* (2021.01)

(58) Field of Classification Search
  CPC ..... H01M 50/148; H01M 50/152–153; H01M 50/172–181; H01M 50/183–188; H01M 50/543–547; H01M 50/552; H01M 50/559; H01M 50/60–609; H01M 50/627–655
  See application file for complete search history.

(56) References Cited

U.S. PATENT DOCUMENTS

| | | | | |
|---|---|---|---|---|
| 2002/0142216 | A1* | 10/2002 | Skoumpris | H01M 50/543 429/94 |
| 2003/0211388 | A1* | 11/2003 | Ruth | H01M 50/538 429/176 |
| 2006/0099502 | A1* | 5/2006 | Kim | H01M 10/0587 429/174 |
| 2007/0117011 | A1* | 5/2007 | Myerberg | H01M 50/636 428/615 |
| 2012/0321937 | A1 | 12/2012 | Hutzler et al. | |
| 2014/0050948 | A1 | 2/2014 | Hashimoto et al. | |
| 2015/0047180 | A1* | 2/2015 | Schmidt | H01M 10/0431 29/623.1 |
| 2017/0170450 | A1* | 6/2017 | Guen | H01M 50/148 |
| 2017/0207491 | A1 | 7/2017 | Tamachi et al. | |
| 2018/0145289 | A1* | 5/2018 | Yu | H01M 50/211 |
| 2021/0242438 | A1* | 8/2021 | Lee | H01M 50/152 |
| 2021/0408626 | A1* | 12/2021 | Ko | H01M 50/179 |

FOREIGN PATENT DOCUMENTS

| | | |
|---|---|---|
| CN | 2833898 Y | 11/2006 |
| CN | 101305481 A | 11/2008 |
| CN | 201436694 U | 4/2010 |
| CN | 106159350 A | 11/2016 |
| CN | 106654077 A | 5/2017 |
| CN | 107068960 A | 8/2017 |
| CN | 107768586 A | 3/2018 |
| CN | 207282605 U | 4/2018 |
| CN | 108023037 A | 5/2018 |
| CN | 108172700 A | 6/2018 |
| CN | 207651537 U | 7/2018 |
| CN | 109192889 A | 1/2019 |
| CN | 110459705 A | 11/2019 |
| CN | 209804717 U | 12/2019 |
| CN | 110880566 A | 3/2020 |
| CN | 210224214 U | 3/2020 |
| CN | 211238301 U | 8/2020 |
| CN | 111613739 A | 9/2020 |
| CN | 111900275 A | 11/2020 |
| CN | 212434722 U | 1/2021 |
| CN | 212434725 U | 1/2021 |
| CN | 112531242 A | 3/2021 |
| EP | 3920298 A1 | 12/2021 |
| EP | 3940877 A1 | 1/2022 |
| FR | 3034912 A1 | 10/2016 |
| JP | 2011216479 A | 10/2011 |
| KR | 20200020173 A | 2/2020 |
| WO | 2021185074 A1 | 9/2021 |
| WO | 2021244272 A1 | 12/2021 |
| WO | 2021244618 A1 | 12/2021 |
| WO | 20211244272 A1 | 12/2021 |

OTHER PUBLICATIONS

First Office Action in EP Patent Application No. 20217378.7 dated Jan. 26, 2022.
International Search Report in International Patent Application No. PCT/CN2021/078680 dated Apr. 29, 2021.
International Search Report in International Patent Application No. PCT/CN2021/094182 dated Aug. 18, 2021.
International Search Report in International Patent Application No. PCT/CN2021/098182 dated Aug. 26, 2021.
First Office Action in CN Patent Application No. 202010496417.7 dated May 18, 2023.
European Search Report in EP Patent Application No. 21770741.3 dated Jul. 18, 2023.
European Search Report in EP Patent Application No. 23177520.6 dated Sep. 15, 2023.
European Search Report in EP Patent Application No. 23177530.5 dated Sep. 15, 2023.

* cited by examiner

BUTTON CELL AND ELECTRONIC DEVICE

CROSS-REFERENCE TO RELATED APPLICATIONS

This application claims priority to Chinese Patent Application No. 202010496417.7, filed on Jun. 3, 2020, and Chinese Patent Application No. 202021331670.9, filed on Jul. 8, 2020, both of which are hereby incorporated by reference in their entireties.

TECHNICAL FIELD

The present disclosure relates to the field of battery technology and, in particular, to a button cell and an electronic device.

BACKGROUND

A button cell refers to a battery with shape and size similar to a button. Generally speaking, it is larger in diameter and smaller in thickness. Because of its small size, the button cell has been widely used in various microelectronic devices, such as those in the field of wearable electronic devices and medical products.

Since the interior of a button cell is a closed space, sealing performance is extremely important for the button cell. However, the button cell in the prior art has inferior sealing performance.

SUMMARY

In view of the foregoing problems, embodiments of the present disclosure provide a button cell and an electronic device with improved sealing performance.

In order to achieve the above objectives, the embodiments of the present disclosure provide following technical solutions.

A first aspect of the embodiments of the present disclosure provides a button cell, including a case, a cell and a conductive member, where the case includes a bottom shell, and a top cover connected to the bottom shell in a sealed manner, the bottom shell and the top cover enveloping and forming an accommodating cavity for accommodating the cell; the top cover is provided with an opening in communication with the accommodating cavity, the conductive member covers the opening, and is connected to the top cover through a sealant ring in an insulated and sealed manner; the conductive member is further provided with a liquid injection port for injecting an electrolyte solution into the accommodating cavity, the liquid injection port being covered with a sealing member which is connected to the liquid injection port in a sealed manner; and the cell has a first tab and a second tab, the first tab being electrically connected to the case, and the second tab being electrically connected to the conductive member.

In an alternative embodiment, the conductive member is provided with an extension part which passes through the opening and extends into the accommodating cavity; and the second tab is electrically connected to an end of the extension part facing the accommodating cavity.

In an alternative embodiment, a first glue-overflow groove is formed between the extension part and an edge of the opening, and the width of the first glue-overflow groove along a radial direction of the cell is 0.1-3 mm.

In an alternative embodiment, the sealing member is a sealing nail; a first counter bore is arranged on an end of the liquid injection port facing away from the accommodating cavity, and the diameter of the first counter bore is greater than that of the liquid injection port; the first counter bore is in communication with the liquid injection port, and the sealing nail is located in the first counter bore and is connected to the first counter bore in a sealed manner.

In an alternative embodiment, the sealing nail is welded to the first counter bore.

In an alternative embodiment, a cell cavity is formed in the center of the cell, and the cell cavity, the case and the liquid injection port are arranged coaxially.

In an alternative embodiment, a second counter bore is arranged on the top cover, the conductive member is located in the second counter bore, with an upper surface of the conductive member being flush with an upper surface of the top cover.

In an alternative embodiment, a second glue-overflow groove is formed between an outer edge of the conductive member and a side wall of the second counter bore, and the width of the second glue-overflow groove along the radial direction of the cell is 0.1-3 mm.

In an alternative embodiment, the button cell further includes an abutment member located in, and arranged coaxially with, the cell cavity, with an end of the abutment member abutting against the first tab to press the first tab against an inner bottom wall of the bottom shell.

In an alternative embodiment, a first insulating rubber layer is arranged between a lower end surface of the cell and an inner bottom wall of the case, and the first insulating rubber layer is provided with a first through hole arranged coaxially with the cell cavity.

In an alternative embodiment, the diameter of the first through hole is greater than that of the cell cavity.

In an alternative embodiment, a second insulating rubber layer is arranged between an upper end surface of the cell and an inner top wall of the case, and the second insulating rubber layer is provided with a second through hole arranged coaxially with the cell cavity.

In an alternative embodiment, the diameter of the second through hole is greater than that of the cell cavity.

In an alternative embodiment, a third insulating rubber layer is arranged between the second tab and the top cover.

In an alternative embodiment, the third insulating rubber layer is attached to an inner wall of the top cover, and a circumference of the third insulating rubber layer is smaller than a circumference of the top cover along the radial direction of the cell;

the third insulating rubber layer is further provided with a third through hole arranged coaxially with the cell cavity, a diameter of the third through hole is less than the radial dimension of the opening.

In an alternative embodiment, the third insulating rubber layer is attached to a side of the second tab closer to the top cover, and a distance between an outer edge of the third insulating rubber layer and an axis of the cell is less than a distance between the opening and the axis of the cell along the radial direction of the cell.

In an alternative embodiment, a concave weld mark is arranged on a surface of the first tab facing the cell, and the weld mark is located in an area corresponding to the first through hole and the cell cavity.

In an alternative embodiment, an area on an outer bottom wall of the bottom shell corresponding to the weld mark is a smooth flat surface or a rounded surface.

In an alternative embodiment, a depth of the weld mark is 20-200 μm; or, a height of the weld bump formed after welding is 10-120 μm.

A second aspect of the embodiments of the present disclosure further provides an electronic device including an electronic device body and the button cell provided by the first aspect, where the button cell supplies electrical energy to the electronic device body.

The button cell and the electronic device provided by the embodiments of the present disclosure have following advantages:

In the button cell provided by the embodiments of the present disclosure, a conductive member covers an opening of a top cover, the top cover being connected to the conductive member through a sealant ring in an insulated and sealed manner. A cell is placed in an accommodating cavity of a bottom shell, with a first tab on the cell being welded to an inner bottom wall of the bottom shell. Then, the top cover having the conductive member is connected to the bottom shell in a sealed manner, with a second tab on the cell being electrically connected to the conductive member. Finally, an electrolyte solution is injected into the accommodating cavity through a liquid injection port of the conductive member. After the electrolyte solution is injected, a sealing member covers the liquid injection port, and the sealing member is connected to the liquid injection port in a sealed manner, thereby improving sealing performance of the button cell.

In addition to the technical problems solved by the embodiments of the present disclosure, the technical features constituting the technical solutions, and the beneficial effects brought about by the technical features of these technical solutions, as described above, other technical problems that can be solved by the button cell and the electronic device provided by the embodiments of the present disclosure, other technical features included in the technical solutions, and the beneficial effects brought about by the technical features will be illustrated in further detail in relation to the specific implementations.

BRIEF DESCRIPTION OF THE DRAWINGS

In order to illustrate embodiments of the present disclosure more explicitly, the following will briefly introduce the drawings required in the description of the embodiments. Obviously, the drawings in the following description are some embodiments of the present disclosure. Those skilled in the art can obtain other drawings based on these drawings without creative works.

DESCRIPTION OF REFERENCE NUMBERS

10—case;
101—bottom shell;
1011—accommodating cavity;
102—top cover;
1021—opening;
1022—first glue-overflow groove;
1023—second glue-overflow groove;
20—cell;
201—first tab;
202—second tab;
203—cell cavity;
30—conductive member;
301—liquid injection port;
302—first counter bore;
303—extension part;
40—sealing member;
50—sealant ring;
60—abutment member;
70—first insulating rubber layer;
701—first through hole;
702—first cut edge;
80—second insulating rubber layer;
801—second through hole;
802—second cut edge;
90—third insulating rubber layer;
901—third through hole.

DETAILED DESCRIPTION

Since the interior of a button cell is a closed space, the sealing performance is extremely important for the button cell. However, in the prior art, firstly, an electrolyte solution is injected into an accommodating cavity where a cell is placed, and then a conductive member is configured to pass through an opening of a case, so that the conductive member is riveted to the opening, and an insulated sealant ring is provided between the conductive member and the opening. However, when the conductive member is being riveted to the opening, the case will be shocked, and the electrolyte solution in the accommodating cavity will splash to the sealant ring, causing partial failure of the sealant ring, resulting in inferior sealing performance.

In order to solve the above problems, in the button cell provided by the embodiments of the present disclosure, a conductive member covers an opening of a top cover, such that the top cover is connected to the conductive member through a sealant ring in an insulated and sealed manner. A cell is arranged in an accommodating cavity of a bottom shell, with a first tab on the cell being welded to an inner bottom wall of the bottom shell. Then, the top cover having the conductive member is connected to the bottom shell in a sealed manner, with a second tab on the cell being electrically connected to the conductive member. An electrolyte solution is injected into the accommodating cavity through a liquid injection port of the conductive member. After the electrolyte solution is injected, the liquid injection port is covered by a sealing member, and the sealing member is connected to the liquid injection port in a sealed manner by bonding or welding, thereby improving sealing performance of the button cell.

In order to make the above objectives, technical features and advantages of the embodiments of the present disclosure more explicit and understandable, the technical solutions in the embodiments of the present disclosure are illustrated clearly and completely in combination with the accompanying drawings in the embodiments of the present disclosure hereinafter. Obviously, the embodiments described are only a part of embodiments of the present disclosure, and are not all of the embodiments thereof. Based on the embodiments of the present disclosure, all the other embodiments obtained by those skilled in the art without creative works are within the protection scope of the present disclosure.

Example I

Figure 1:
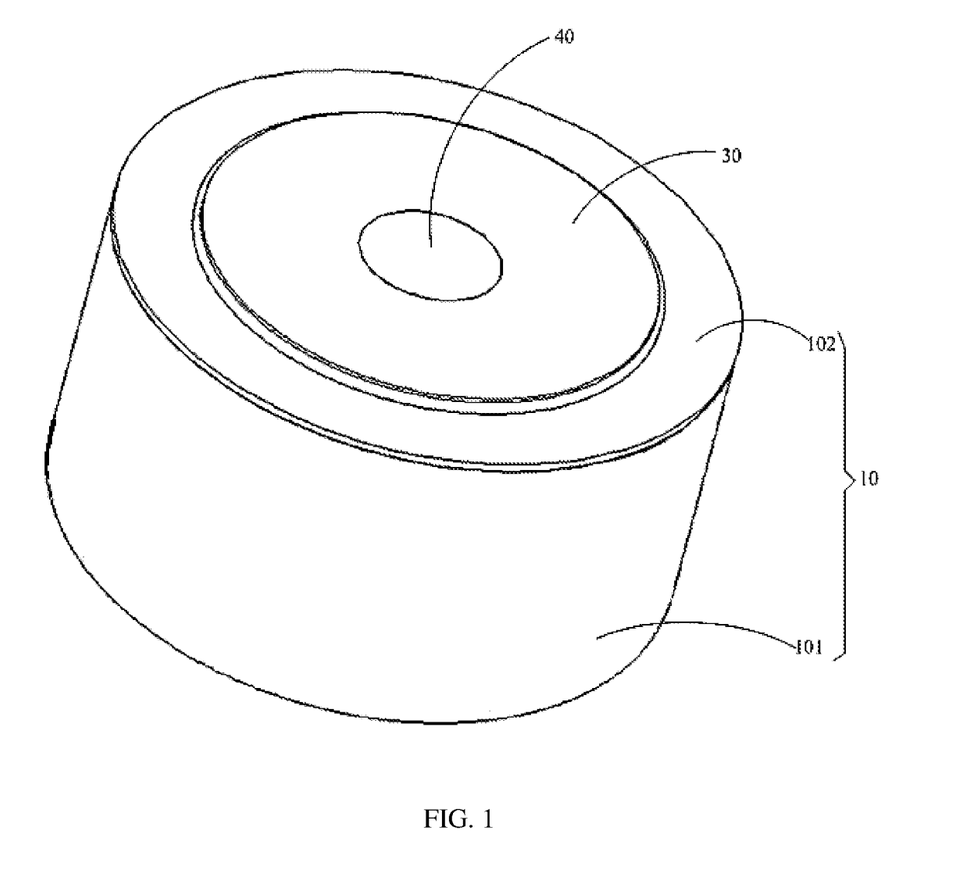
FIG. 1 is a schematic structural diagram of a button cell provided by Example I of the present disclosure.
Figure 2:
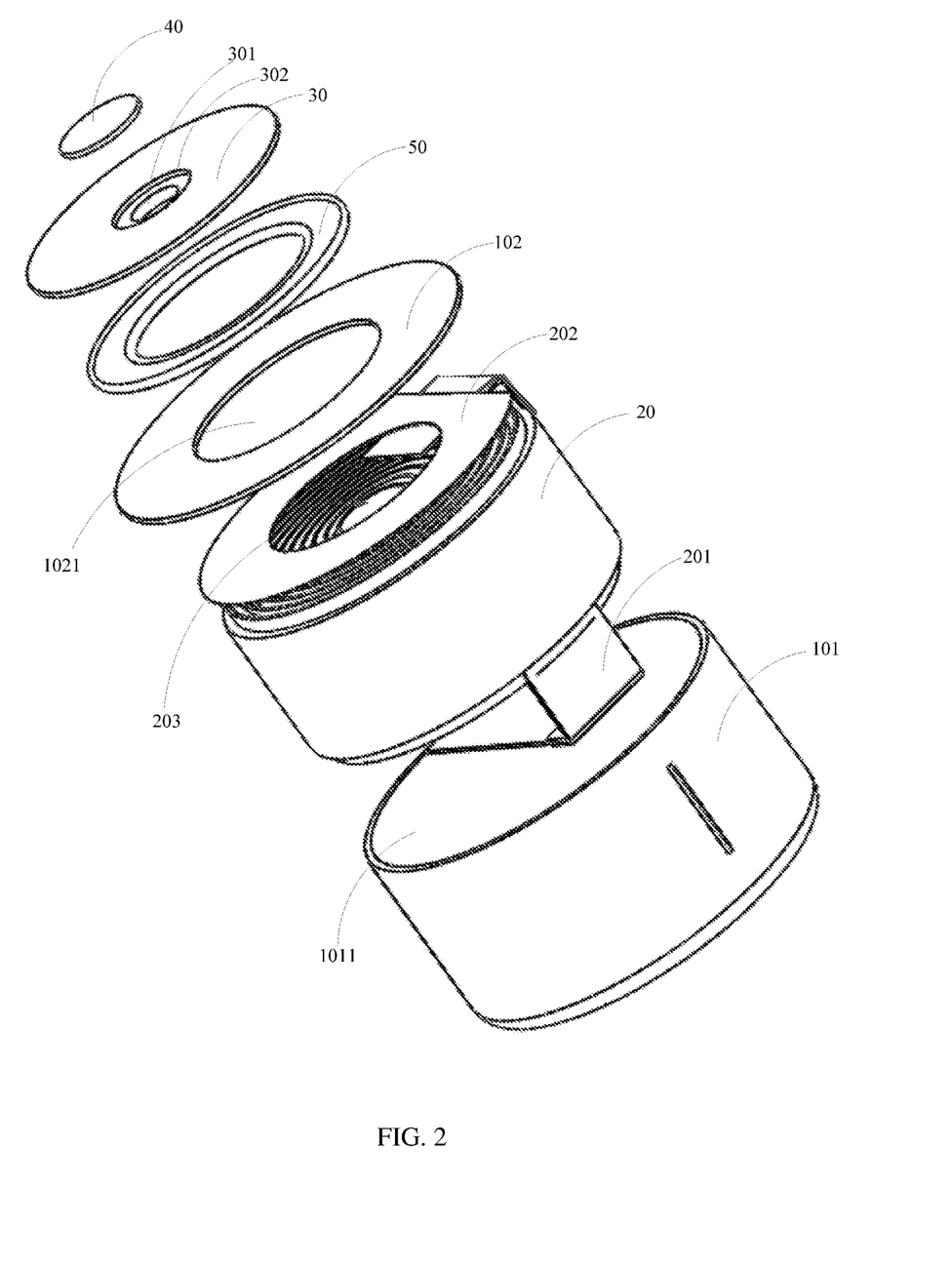
FIG. 2 is an exploded structural diagram of a button cell provided by Example I of the present disclosure.

As shown in FIG. 1 and FIG. 2, a button cell provided by the examples of the present disclosure includes: a case 10, a cell 20 arranged in an accommodating cavity 1011 of the case 10, and a conductive member 30 which is arranged on the case 10 and connected to the case 10 in an insulated manner. The conductive member 30 is provided with a liquid injection port 301 for injecting an electrolyte solution into the accommodating cavity 1011, and a sealing member 40 which covers the liquid injection port 301. The sealing member 40 is connected to the liquid injection port 301 in a sealed manner. The cell 20 has thereon a first tab 201 and a second tab 202, where the first tab 201 is electrically connected to the case 10 by welding and the like, and the second tab 202 is also electrically connected to the conductive member 30 by welding or bonding. The case 10 and the conductive member 30 are electrically connected to an electronic device, respectively, so that the cell 20 provides electrical energy for the electronic device through the case 10 and the conductive member 30.

Figure 3:
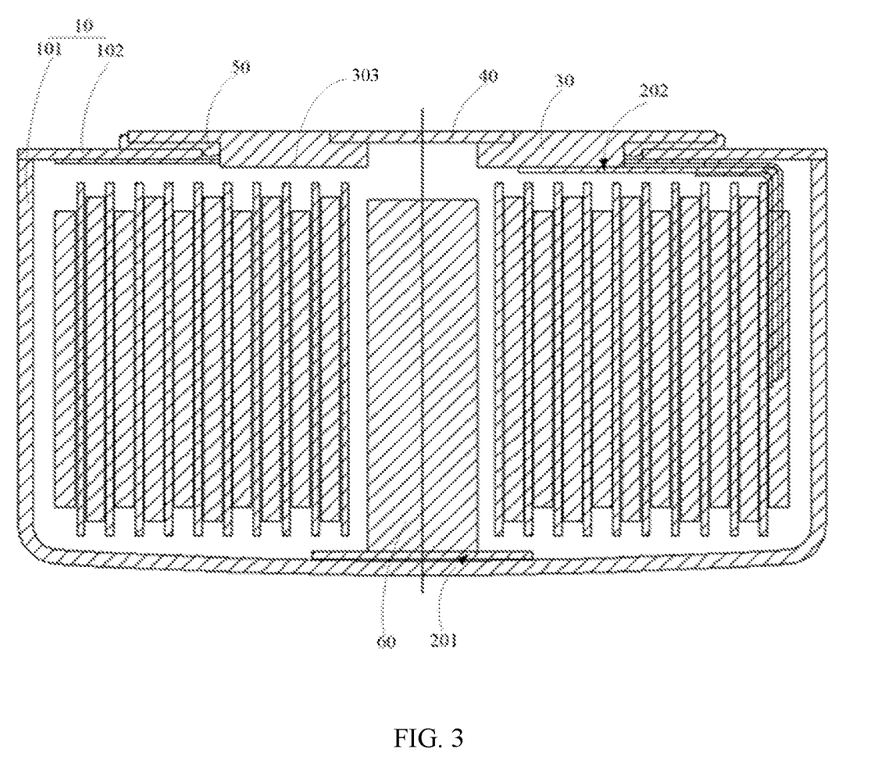
FIG. 3 is a schematic diagram of an internal structure of a first structure of a button cell provided by Example I of the present disclosure.
Figure 4:
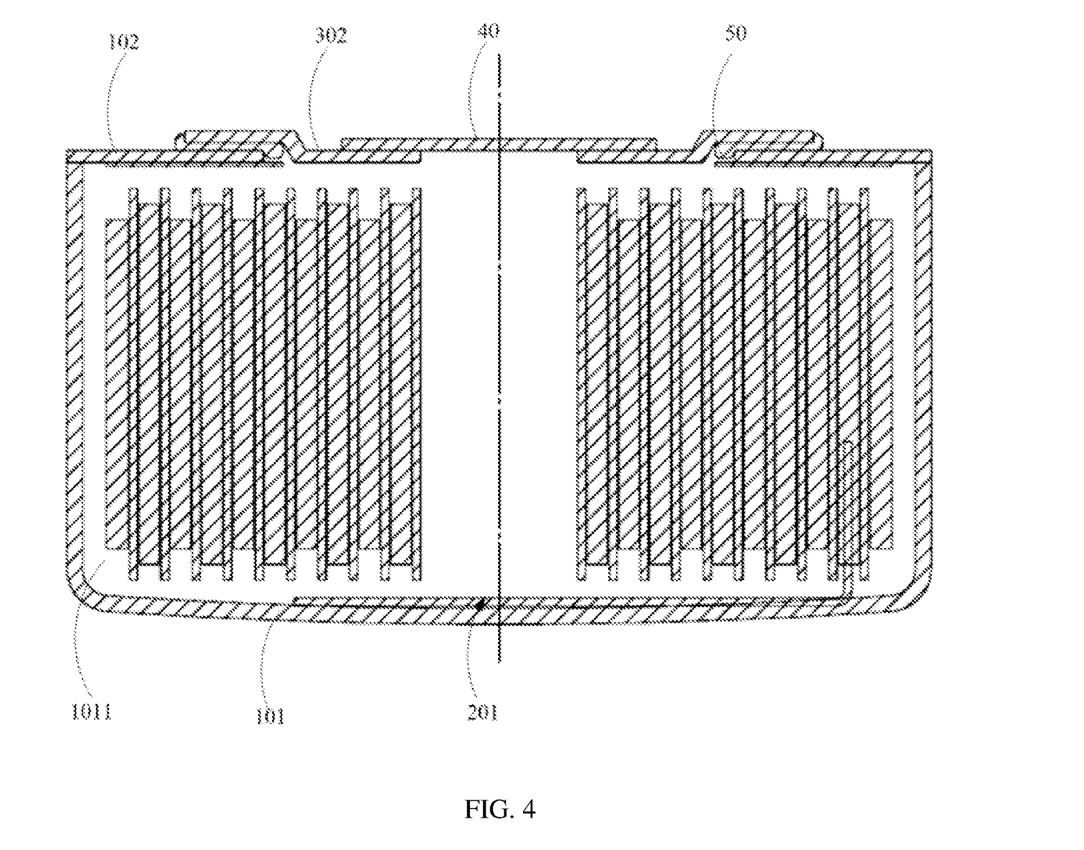
FIG. 4 is a schematic diagram of an internal structure of a second structure of a button cell provided by Example I of the present disclosure.

As shown in FIG. 2 to FIG. 4, the case 10 includes a bottom shell 101 and a top cover 102, the bottom shell 101 is provided with a sink extending towards a bottom wall of the bottom shell 101, forming the accommodating cavity 1011 for accommodating the cell 20. The top cover 102 covers an opening which is in communication with the accommodating cavity 1011, so that the case 10 having the accommodating cavity 1011 is enveloped and formed by the bottom shell 101 and the top cover 102. In order to improve the sealing performance, the top cover 102 and the bottom shell 101 are connected in a sealed manner, such as by way of welding and the like.

The shape of the cross section of the case 10 can be any shape such as a circle, an ellipse, and a polygon, etc., which is not limited in the present embodiment.

Since the cell 20 provides electrical energy for the electronic device through the case 10 and the conductive member 30, the case 10 and the conductive member 30 can be made of stainless steel, copper, iron or other metal materials.

The top cover 102 is provided with an opening 1021, so that the top cover 102 forms a ring structure. The conductive member 30 covers the opening 1021, with a sealant ring 50 arranged in between, where the sealant ring 50 makes the conductive member 30 be connected to the opening 1021 in an insulated and sealed manner. In other words, the conductive member 30 is bonded to an edge of the opening 1021 through the sealant ring 50, and covers the opening 1021 of the top cover 102. The shape of the opening 1021 can be a circle, an ellipse, or a polygon, etc.

In order to improve the sealing performance of the connection between the conductive member 30 and the top cover 102, the conductive member 30 can be bonded to the top cover 102 through the sealant ring 50 by heating and pressurizing. In this way, the bonding reliability of the sealant ring 50 can be improved, thereby improving the sealing performance of the connection between the conductive member 30 and the top cover 102.

Figure 5:
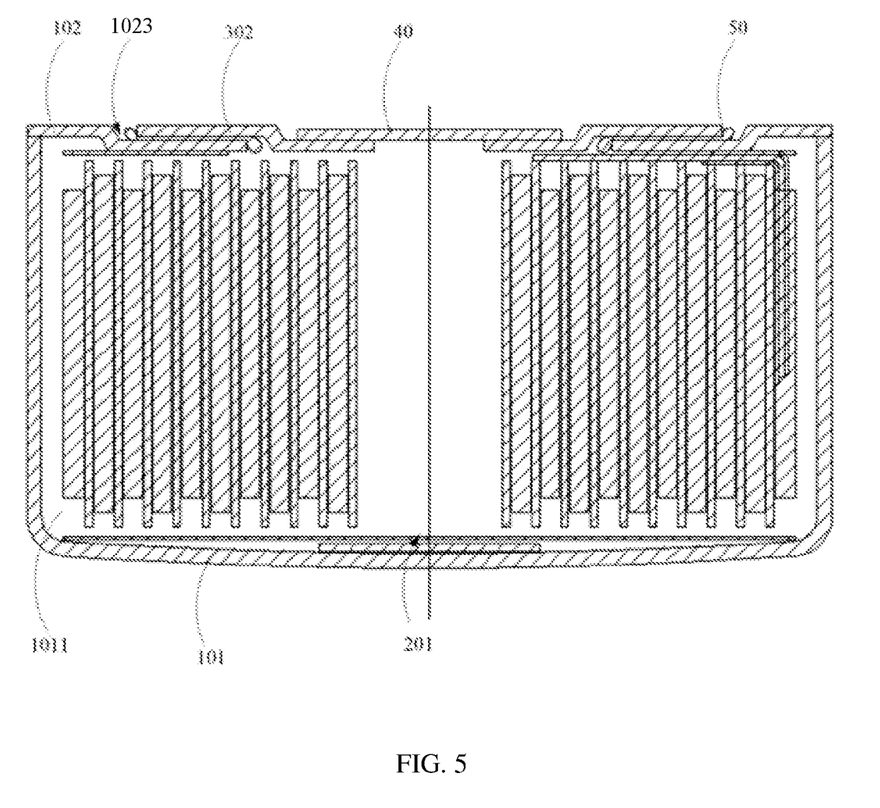
FIG. 5 is a schematic diagram of an internal structure of a third structure of a button cell provided by Example I of the present disclosure.

Furthermore, the conductive member 30 may protrude out of the surface of the top cover 102. Or, a second glue-overflow groove 1023 for placing the conductive member 30 may be provided on the top cover 102, such that the conductive member 30 may reside in the second glue-overflow groove 1023, as shown in FIG. 5, with upper surfaces of the conductive member 30 and the top cover 102 being even. When the conductive member 30 is connected to the top cover 102 through the sealant ring 50 in an insulated and sealed manner, glue will overflow at the sealant ring 50 during the heating and pressurizing. But with the above arrangement, the overflowed glue will be kept within the second glue-overflow groove 1023 and will not overflow the surface of the top cover 102. In this way, the surface of the top cover 102 is relatively flat, and the overall structure of the button cell is more compact, improving the overall aesthetics of the button cell.

In an embodiment, the opening 1021 is a circular hole, the conductive member 30 is a disc shape, and the diameter of the opening 1021 is less than that of the conductive member 30. Thus, at least a partial edge of the conductive member 30 overlaps with a partial edge of the opening 1021 in the radial direction. The opening 1021 and the conductive member 30 are tightly bonded through the sealant ring 50 by heating and pressurizing. The sealant ring 50 under high temperature and high pressure can make the opening 1021 be connected to the conductive member 30 more tightly, thereby improving the sealing performance of the button cell.

Since larger overlapped unilateral part between the edge of the conductive member 30 and the edge of the opening 1021 in the radial direction means better sealing performance, the overlapped unilateral part between the conductive member 30 and the opening 1021 in the radial direction is greater than or equal to 0.3 mm in an embodiment. In this way, the sealing area between the conductive member 30 and the opening 1021 is increased, thereby improving the sealing performance between the conductive member 30 and the opening 1021.

Furthermore, as shown in FIG. 3, the conductive member 30 is provided with an extension part 303 which passes through the opening 1021. For example, the conductive member 30 may be formed into a T-shaped conductive member 30. In this way, the extension part 303 and a hole wall of the opening 1021 are connected in a sealed manner through the sealant ring 50, which further increases the sealing area between the conductive member 30 and the opening 1021, thereby improving the sealing performance between the conductive member 30 and the opening 1021. In that case, the sealant ring 50 can be made from a soluble material to improve the corrosion resistance and the sealing performance of the sealant ring 50 against electrolyte solution.

In that case, the sealant ring 50 is shaped as a ring. When the conductive member 30 and the top cover 102 is heated and pressurized, an outer edge of the sealant ring 50 overflows out of the joint of the conductive member 30 and the top cover 102, while an inner edge of the sealant ring 50 overflows out of the joint of the sealant ring 50 and an edge of the opening 1021 of the top cover 102. In this way, the connection reliability of the sealant ring 50 in connecting the conductive member and the top cover 102 can be ensured.

On the basis of the above embodiment, as shown in FIG. 1 to FIG. 4, the conductive member 30 is also provided with a liquid injection port 301 for injecting an electrolyte solution into the accommodating cavity 1011, where the liquid injection port 301 can be in any shape, such as a circle, a quadrangle, a polygon, etc. In an embodiment, the liquid injection port 301 is arranged coaxially with the conductive member 30, and the conductive member 30 is arranged coaxially with the accommodating cavity 1011 for accommodating the cell 20 in the case 10.

In an embodiment, in order to improve the sealing performance between the sealing member 40 and the liquid injection port 301, a first counter bore 302 is arranged on one end of the liquid injection port 301 facing away from the accommodating cavity 1011, and the diameter of the first counter bore 302 is greater than that of the liquid injection port 301. The first counter bore 302 is in communication with and arranged coaxially with the liquid injection port 301. In that case, the shape of the first counter bore 302 conforms to the shape of the liquid injection port 301. In other words, when the shape of the liquid injection port 301 is circular, the shape of the first counter bore 302 is also circular. Exemplarily, the depth of the first counter bore 302 may be 0.01-0.5 mm.

The liquid injection port 301 is covered with a sealing member 40. In other words, the sealing member 40 is located in the first counter bore 302. Since the depth of the first counter bore 302 is relatively small, the sealing member 40 may be a sheet structure located in the first counter bore 302 to cover the liquid injection port 301. In order to improve sealing performance, the sealing member 40 is connected to the liquid injection port 301 in a sealed manner. For example, the sealing member 40 can be welded to the liquid injection port 301. In other words, after the electrolyte solution is injected into the accommodating cavity 1011 through the liquid injection port 301, welding is performed at the joint between the sealing member 40 and the first counter bore 302 outside the case 10, so as to improve the sealing performance.

Exemplarily, the sealing member 40 can be a sealing nail. The sealing nail is placed within the first counter bore 302, then the joint therebetween is welded together.

As shown in FIG. 4, when the sealing nail is sealed with the liquid injection port 301 by welding, in order to facilitate welding, the diameter of the first counter bore 302 is greater than that of a cap of the sealing nail. The part of the sealing nail located in the first counter bore 302 has a weld mark, in other words, a welding device can weld the joint between the sealing nail and the conductive member 30 from the inside of the first counter bore 302. For example, a laser beam of a laser welding device can extend into the first counter bore 302 to weld the sealing nail and the conductive member 30 together.

Alternatively, the sealing member 40 can also be located in the first counter bore 302 and bonded with the counter bore through a sealant ring or the like, so as to simplify the manufacturing process.

In an alternative implementation, the cell 20 is a wound-type cell 20. Specifically, the wound-type cell 20 includes a first plate, a second plate and a battery separator separating the two. The first plate is provided with a first tab 201, which can be arranged on the first plate by welding. The second plate is provided with a second tab 202, which can be arranged on the second plate by welding. In a winding process, the first plate, the second plate, and the battery separator are wound layer by layer in the same direction from a winding head, eventually forming the wound-type cell 20.

It is understandable that the first plate of the cell 20 can be a positive plate, and the second plate can be a negative plate. In this case, the first tab 201 arranged on the first plate is a positive tab, and the second tab 202 arranged on the second plate is a negative tab. In a specific implementation, the cell 20 is accommodated within the accommodating cavity 1011. The positive tab is electrically connected to an inner bottom wall of the bottom shell 101 by welding, so that the bottom shell 101 is formed into a positive electrode of a button cell. The negative tab is electrically connected to the conductive member 30, so that the conductive member 30 is formed into a negative electrode of the button cell. When the button cell is applied to an electronic device, the bottom shell 101 is electrically connected to a positive electrode of the electronic device, and the conductive member 30 is electrically connected to a negative electrode of the electronic device, so that the cell 20 supplies power to the electronic device.

Or, the first plate of the cell 20 can be a negative plate, and the second plate can be a positive plate. In this case, the first tab 201 arranged on the first plate is a negative tab, and the second tab 202 arranged on the second plate is a positive tab. In a specific implementation, the cell 20 is accommodated within the accommodating cavity 1011. The negative tab is electrically connected to the bottom shell 101 by welding, so that the bottom shell 101 is formed into a negative electrode of a button cell. The positive tab is electrically connected to the conductive member 30, so that the conductive member 30 is formed into a positive electrode of the button cell. When the button cell is applied to an electronic device, the bottom shell 101 is electrically connected to a negative electrode of the electronic device, and the conductive member 30 is electrically connected to a positive electrode of the electronic device, so that the cell 20 supplies power to the electronic device.

In an embodiment, the second tab 202 is electrically connected to an end of the extension part 303 of the conductive member 30 extending into the accommodating cavity 1011, such that the contact area between the second tab 202 and the conductive member 30 can be increased, thereby improving the reliability of the electrical connection. In that case, in order to prevent the top cover 102 from interfering with the connection between the second tab 202 and the extension part 303, one end of the extension part 303 facing the accommodating cavity 1011 is arranged to protrude out of an inner wall of the top cover 102 after the extension part 303 is extended into the accommodating cavity 1011. In this way, when the second tab 202 is connected to an end surface of the extension part 303, a gap can be found between the second tab 202 and the inner wall of the top cover 102. Or, an insulating layer can be provided between the inner wall of the top cover 102 and the second tab 202, so as to improve the reliability of the electrical connection between the second tab 202 and the conductive member 30.

It should be noted that the first tab 201 is electrically connected to the top cover 102 in the case 10 by welding or bonding.

Alternatively, in order to improve the reliability of the electrical connection between the first tab 201 and the second tab 202, an insulating layer can be provided on both the first tab 201 and the second tab 202 in the circumferential direction, and the first tab 201 or the second tab 202 only needs to expose a part to be electrically connected to the bottom shell 101 or the conductive member 30.

Alternatively, a cell cavity 203 can be formed at a center position of the wound-type cell 20 while winding. After the cell 20 is placed into the accommodating cavity 1011, the cell cavity 203 and the liquid injection port 301 are arranged coaxially. In this way, when an electrolyte solution is injected into the accommodating cavity 1011, the plates and the battery separator and so on in the cell 20 will not block the injection of the electrolyte solution, which improves the efficiency of the injection of the electrolyte solution, thereby increasing the production efficiency of the button cell.

In an embodiment, as shown in FIG. 3, an abutment member 60 can also be inserted into the cell cavity 203 via the liquid injection port 301, where the abutment member 60 may be a column structure, such as a cylindrical structure or a prismatic structure. It can be composed of one column piece, or two or more column pieces connected end to end in sequence. When the first tab 201 is welded to the inner bottom wall of the bottom shell 101, the abutment member 60 is firstly inserted into the cell cavity 203, so that a first end of the abutment member 60 abuts against the first tab 201, with pressure applied to a second end of the abutment member 60, so that the first tab 201 is pressed against the inner bottom wall of the bottom shell 101 by the pressure from the abutment member 60 before the welding is performed. In this way, the reliability of the welding between the first tab 201 and the bottom shell 101 can be improved, thereby improving the reliability of the electrical connection between the first tab 201 and the bottom shell 101.

It should be noted that, in order to facilitate a user to operate, the second end of the abutment member 60 can protrude out of the top cover 102 of the case 10. When the first tab 201 has been welded to the inner bottom wall of the bottom shell 101 in the button cell, and the top cover 102 having conductive member 30 is connected to the bottom shell 101 in a sealed manner, the abutment member 60 can be retracted out of the cell cavity 203 via the liquid injection port 301.

Due to the possibility of vibration during a welding process, if the bottom shell 101 is connected to the top cover 102 in a sealed manner before the first tab 201 is welded to the bottom shell 101, the vibration will cause a displacement between the bottom shell 101 and the top cover 102, leading to misalignment therebetween. As a result, the sealing connection between the bottom shell 101 and the top cover 102 can become loose or fail, eventually leading to inferior sealing performance of the button cell. Therefore, in the present embodiment, the cell 20 with the first tab 201 and the second tab 202 are firstly placed into the accommodating cavity 1011 of the bottom shell 101, and the abutment member 60 is inserted into the cell cavity 203 of the cell 20 to press on the first tab 201, so that the first tab 201 is pressed against the inner bottom wall of the bottom shell 101. After that, a welding device is utilized to weld the bottom shell 101 and the first tab 201 to create the electrical connection between the first tab 201 and the bottom shell 101, and then, the top cover 102 having the conductive member 30 is connected to the bottom shell 101 in a sealed manner by welding or bonding. Although vibration will still occur when the bottom shell 101 is being welded to the top cover 102, the abutment member 60 will constantly abut against the first tab 201, preventing the problem of connection looseness caused by the vibration, between the first tab 201 and the inner wall of the bottom shell 101. This can, while ensuring the reliability of the connection between the first tab 201 and the bottom shell 101, improve the reliability of the sealing connection between the bottom shell 101 and the top cover 102, thereby improving the sealing performance of the button cell.

In a specific implementation of the button cell provided by the embodiments of the present disclosure, the top cover 102 is firstly connected, by heating and pressurizing, to the conductive member 30 through a sealant ring 50 in an insulated and sealed manner, and then the cell 20 is placed into the accommodating cavity 1011 in the bottom shell 101. The abutment member 60 is inserted into the cell cavity 203, with a first end of the abutment member 60 abutting against the first tab 201, and a second end of the abutment member 60 protruding out of the top cover 102. By pressing on the abutment member 60, the first tab 201 is pressed against the inner bottom wall of the bottom shell 101. The first tab 201 is welded to the bottom shell 101 by a welding device. Then, the top cover 102 having the conductive member 30 covers the bottom shell 101, and the bottom shell 101 is connected to the top cover 102 in a sealed manner by bonding or welding, and the second tab 202 on the cell 20 is electrically connected to the conductive member 30. Then, the abutment member 60 is retracted, and the electrolyte solution is injected into the accommodating cavity through the liquid injection port 301. After the electrolyte solution is injected, the sealing member 40 covers the injection port 301, and the sealing member 40 is connected to the injection port 301 in a sealed manner by bonding or welding.

In the button cell provided by the embodiments of the present disclosure, the conductive member covers the opening of the top cover, and the top cover is connected to the conductive member through a sealant ring in an insulated and sealed manner, the cell is placed in the accommodating cavity of the bottom shell, the first tab on the cell is welded to the inner bottom wall of the bottom shell, then the top cover having the conductive member is connected to the bottom shell in a sealed manner, and then the second tab on the cell be electrically is connected to the conductive member. An electrolyte solution is injected into the accommodating cavity through the liquid injection port of the conductive member. After the electrolyte solution is injected, the sealing member covers the liquid injection port, and the sealing member is connected to the liquid injection port in a sealed manner by bonding or welding, thereby improving the sealing performance of the button cell.

Example II

As shown in FIG. 6 to FIG. 9, in a button cell provided by the embodiment of the present disclosure, the conductive member 30 is provided with the extension part 303 protruding towards the accommodating cavity. The first glue-overflow groove 1022, which is in ring shape, is formed between the extension part 303 and an edge of the opening, such that a glue overflowing from an inner edge of the sealant ring 50 may reside in the first glue-overflow groove 1022. The overflowed glue can further improve the sealing performance between the conductive member 30 and the top cover 102. The width of the first glue-overflow groove 1022 in a radial direction of the cell 20 is between 0.1 and 3 mm, such that the overflowed glue can be accommodated, at the same time, the external dimension of the button cell can also be fulfilled.

Figure 8:
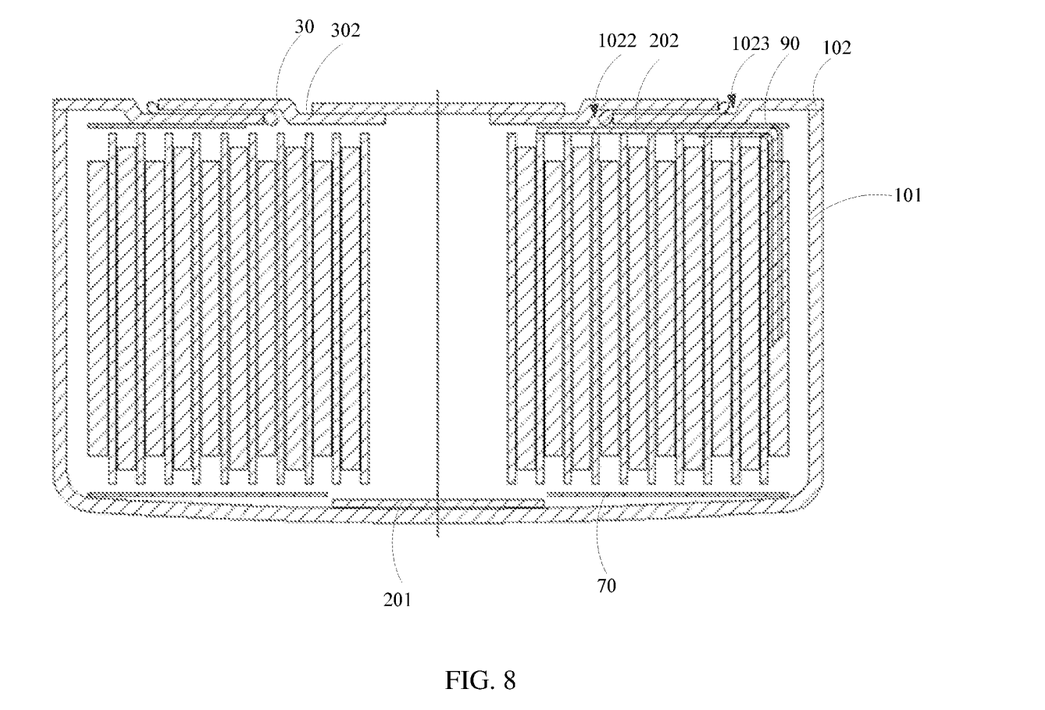
FIG. 8 is a schematic diagram of another internal structure of a button cell provided by Example II of the present disclosure.

Alternatively, as shown in FIG. 8, a second counter bore is arranged on the top cover 102, in which the conductive member 30 is located, and a second glue-overflow groove 1023 is formed between an outer edge of the conductive member 30 and a side wall of the second counter bore. A glue overflowing from an outer edge of the sealant ring 50 may reside in the second glue-overflow groove 1023, further improving the sealing performance between the conductive member 30 and the top cover 102, thereby improving the overall sealing performance of the button cell. Moreover, since the overflowed glue is kept within the second glue-overflow groove 1023, the surface flatness and the overall aesthetics of the button cell can be improved. Additionally, the width of the second glue-overflow groove 1023 in the radial direction of the cell 20 is configured to be between 0.1 and 3 mm, so that the accommodation of the overflowed glue is ensured while the external dimension of the button cell can also be fulfilled.

Furthermore, in order to prevent liquid such as water from infiltrating the cavity of the button cell via the second glue-overflow groove 1023, a sealant can also be arranged in the second glue-overflow groove 1023 to seal up any gap between the conductive member 30 and the case 10, so as to improve the sealing performance of the button cell, where the sealant may be a glue made by mixing any one of acrylic acid, epoxy resin and polyurethane with a curing agent, or a sealant made from other sealing materials, which is not limited in the present embodiment.

In a process of assembling a button cell, since the cell 20 is placed into the accommodating cavity before the first tab 201 on the cell 20 is electrically connected to the inner bottom wall of the bottom shell 101 by welding, etc., an abutment member, which can be a cylindrical pin or the like, is typically inserted into the cell cavity 203 of the cell 20 in order to improve the reliability of the electrical connection between the first tab 201 and the inner bottom wall of the bottom shell 101. The first tab 201 is abutted against the inner bottom wall of the bottom shell 101 by the abutment member before the first tab 201 and the inner bottom wall of the bottom shell 101 are welded.

It should be noted that a surface of the first tab 201 facing the cell is provided with a concave weld mark, at which a welding device welds the first tab 201 and the bottom shell 101 by way of, e.g., electric-resistance welding or laser welding. When the electric-resistance welding is used, there can be one weld mark, and when the laser welding is used, there can be four weld marks. In order to ensure the reliability of the welding, a depth of the weld mark can be 20-200 μm; or, a height of the weld bump formed after the welding can be 10-120 μm. The weld bump after welding may be formed to be one or more individual weld bumps, or a straight line formed by a plurality of weld bumps, which is not limited in the present embodiment.

A first insulating rubber layer 70 is arranged between a lower end surface of the cell 20 and an inner bottom wall of the bottom shell 101 in order to preclude electrical conductivity between the cell 20 and the bottom shell 101. A second insulating rubber layer 80 is arranged between an upper end surface of the cell 20 and the top cover 102 in order to preclude electrical conductivity between the cell 20 and the top cover 102. Thus, in order to facilitate the insertion of the abutment member into the cell cavity 203 of the cell 20 to abut against the first tab 201, and in order to leeway for a welding device to weld the first tab 201 and the bottom shell 101, the first insulating rubber layer 70 in the present embodiment is provided with a first through hole 701, which is arranged coaxially with the cell cavity 203, where the weld mark on the first tab 201 should be arranged in an area corresponding to the first through hole 701 and the cell cavity 203. In other words, the first insulating rubber layer 70 is provided with a first through hole 701, so that the first insulating rubber layer 70 will not shadow the weld mark on the first tab 201. This facilitates the welding device to weld the first tab 201 and the bottom shell 101, without having to arrange any weld mark on the outer bottom wall of the bottom shell 101. That is, an area on an outer bottom wall of the bottom shell 101 corresponding to the weld mark will be a smooth flat surface or a rounded surface. Had the weld mark been arranged on the outer bottom wall of the bottom shell 101, external strong corrosives might corrode the button cell via that weld mark, compromising the safety and reliability of the button cell. In view of this, the weld mark in the present embodiment is arranged on the surface of the first tab 201 facing the cell to avoid such external strong corrosives from corroding the weld mark, thereby improving the safety and reliability of the button cell.

Furthermore, the second insulating rubber layer 80 is provided with a second through hole 801 that is arranged coaxially with the cell cavity 203, so that the abutment member can pass through the first through hole 701, the second through hole 801 and the cell cavity 203 to abut against the first tab 201 to allow for the welding device to weld the first tab 201 and the bottom shell 101, thereby improving the connection reliability between the first tab 201 and the inner bottom wall of the bottom shell 101, simplifying the assembling of the button cell, and improving the safety and reliability of the cell 20.

Furthermore, in order to facilitate the insertion of the abutment member into the cell cavity 203 of the cell 20, the diameter of the first through hole 701 can be greater than that of the cell cavity 203, and the diameter of the second through hole 801 can be greater than that of the cell cavity 203, such that the edge of the first through hole 701 and the edge of the second through hole 801 will not interfere with the insertion of the abutment member.

Figure 7:
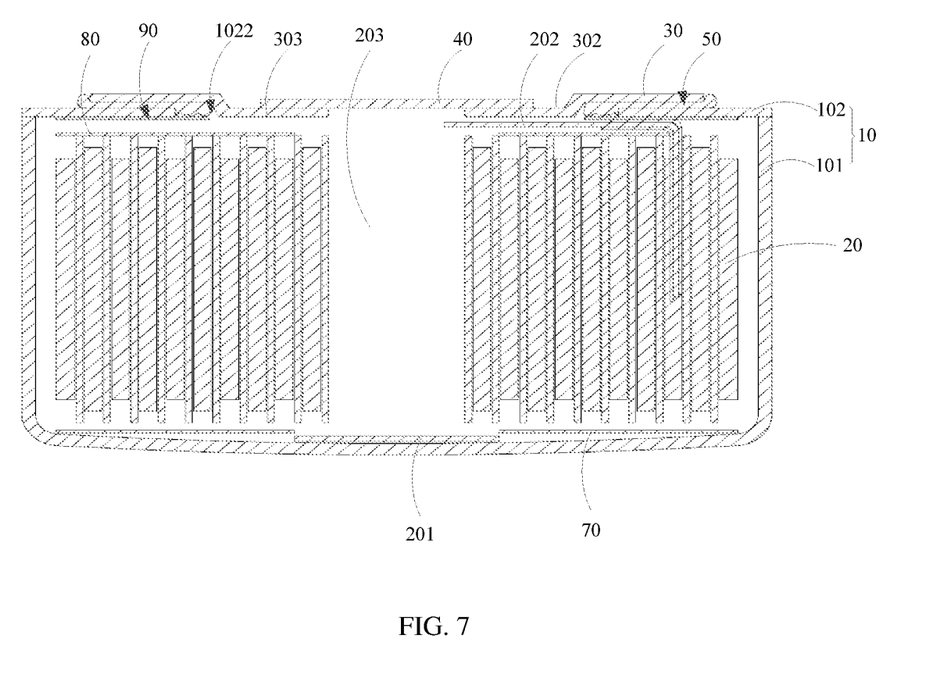
FIG. 7 is a schematic diagram of an internal structure of a button cell provided by Example II of the present disclosure.

Furthermore, as shown in FIG. 7 and FIG. 8, in order to ensure operational reliability of the first insulating rubber layer 70 and the second insulating rubber layer 80, and to facilitate the insertion of the abutment member, the diameter of the first through hole 701 in the present embodiment is 0-0.5 mm larger than that of the cell cavity 203, and the diameter of the second through hole 801 is 0-0.5 mm larger than that of the cell cavity 203. In other words, under ideal conditions, the diameters of the first through hole 701 and the second through hole 801 and the cell cavity 203 are the same. In case of fabrication error, the diameter of the first through hole 701 or the second through hole 801 may be larger than the diameter of the cell cavity 203 in order to avoid interference of the first insulating rubber layer 70 and the second insulating rubber layer 80 in the insertion of the abutment member into the cell cavity 203, as long as insulation is ensured between a lower end surface of the cell 20 and the bottom shell 101, as well as between an upper end surface of the cell 20 and the top cover 102.

On the basis of the above embodiment, in order to ensure that the second tab 202 does not form electrical connection with the top cover 102 when the second tab 202 is electrically connected to the conductive member 30, a third insulating rubber layer 90 is arranged in the present embodiment between the second tab 202 and the top cover 102. The top cover 102 is insulated from the second tab 202 by the third insulating rubber layer 90, so as to improve the reliability of the electrical connection between the second tab 202 and the conductive member 30.

In an implementable embodiment, the third insulating rubber layer 90 is a circular ring that is attached to an inner wall of the top cover 102, and covers a location on the second tab 202 corresponding to the top cover 102.

Specifically, in order to prevent the third insulating rubber layer 90 from interfering with the welding or bonding between the top cover 102 and the bottom shell 101, a circumference of the third insulating rubber layer 90 is smaller than a circumference of the top cover 102 along the radial direction of the cell 20.

Furthermore, the third insulating rubber layer 90 is further provided with a third through hole 901 that is arranged coaxially with the cell cavity 203 in order to prevent the top cover 102 from being electrically connected to the second tab 202. Thus, in the present embodiment, the diameter of the third through hole 901 is less than the radial dimension of the opening of the top cover 102. In this way, electrical connection between the second tab 202 and the top cover 102 can be avoided, while the second tab 202 can partially pass through the third through hole 901 and be electrically connected to the conductive member 30.

In an embodiment, an outer radius of the third insulating rubber layer 90 is 0.05-2 mm smaller than that of the top cover 102 along the radial direction of cell 20, and the diameter of the third through hole 901 is 0-2 mm smaller than the radial dimension of the opening of the top cover 102, so that the reliability of the connection between the second tab 202 and the conductive member 30 is improved.

In another implementable embodiment, the third insulating rubber layer 90 can be attached to a side of the second tab 202 closer to the top cover 102, forming a protective rubber for the second tab 202. A distance between an edge of the third insulating rubber layer 90 on the second tab 202 and the axis of the cell 20 is less than a distance between the opening of the top cover 102 and the axis of the cell 20 along the radial direction of the cell 20. In other words, the protective rubber on the second tab 202 extends along the radial direction of the cell 20 towards the axis of the cell 20, with the edge of the protective rubber on the second tab 202 extending beyond the edge of the opening of the top cover 102. In this way, electrical connection can be precluded between the second tab 202 and the top cover 102, thereby improving the reliability of the connection between the second tab 202 and the conductive member 30.

Figure 6:
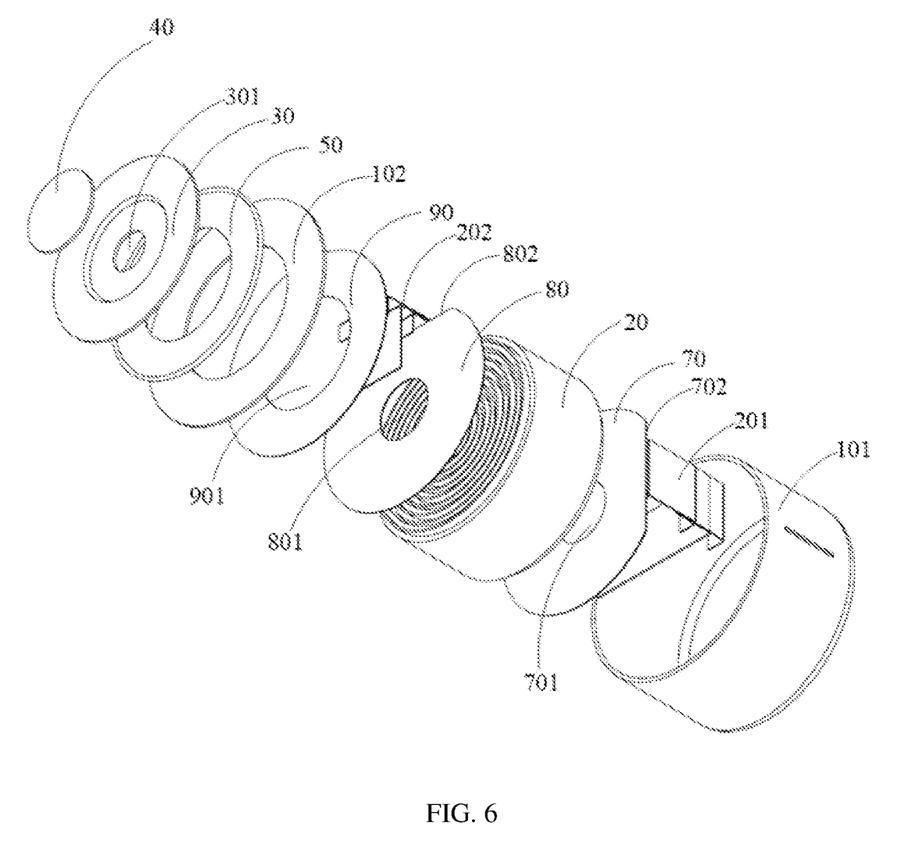
FIG. 6 is an exploded structural diagram of a button cell provided by Example II of the present disclosure.
Figure 9:
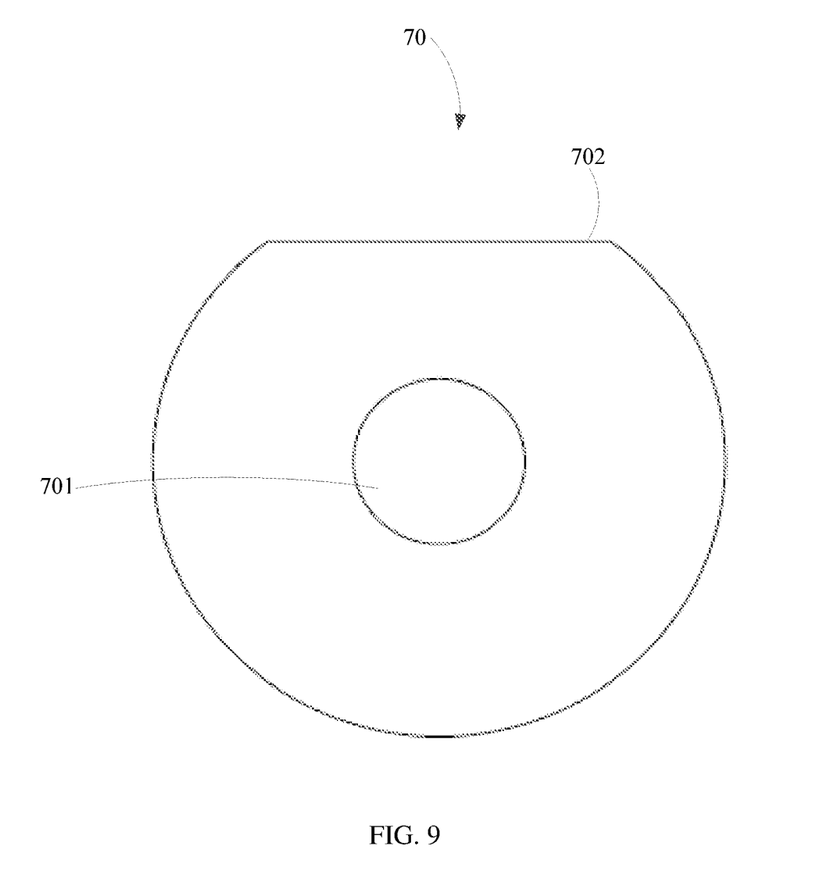
FIG. 9 is a schematic structural diagram of a first insulating rubber layer in a button cell provided by Example II of the present disclosure.

On the basis of the above embodiment, as shown in FIG. 6 and FIG. 9, in order to prevent the first insulating rubber layer 70 from interfering with the connection of the first tab 201 and the plate of the cell 20, edge-cutting treatment is applied to the first insulating rubber layer 70 in the present embodiment, so that the edge of the first insulating rubber layer 70 can be formed into a straight line cut edge. For ease of description, the cut edge on the first insulating rubber layer 70 is referred to herein as a first cut edge 702. Along an axial direction of the cell 20, the first cut edge 702 is flush with the first tab 201, so as to avoid any interference by the first insulating rubber layer 70 with the connection of the first tab 201 and the plate of the cell 20.

Furthermore, in order to avoid the interference in the connection of the second tab 202 and the plate of the cell 20, edge-cutting treatment is also applied to the second insulating rubber layer 80, so that the edge of the second insulating rubber layer 80 can be formed into a straight line cut edge. For ease of description, the cut edge on the second insulating rubber layer 80 is referred to herein as a second cut edge 802. Along an axial direction of the cell 20, the second cut edge 802 is flush with the second tab 202, so as to avoid any interference by the second insulating rubber layer 80 with the connection of the second tab 202 and the plate of the cell 20, thereby improving the operational reliability of the button cell.

Alternatively, the conductive member 30 is also provided with a liquid injection port 301. When the cell 20 is placed in the accommodating cavity, the first tab 201 of the cell 20 is electrically connected to the inner bottom wall of the bottom shell 101, and the second tab 202 is electrically connected to the conductive member 30, an electrolyte solution is then injected into the accommodating cavity via the liquid injection port 301 of the conductive member 30. After the electrolyte solution is injected, the liquid injection port 301 is covered by the sealing member 40 in a sealed manner.

Furthermore, in order to improve the surface flatness of the button cell, a first counter bore for accommodating the sealing member 40 can be arranged on the conductive member 30, and the depth of the first counter bore can be equal to the thickness of the sealing member 40. In this way, when the sealing member 40 covers the liquid injection port 301, the sealing member 40 is flush with the surface of the conductive member 30, thereby improving the surface flatness of the button cell.

In specific implementation of the button cell provided by the embodiment of the present disclosure, the top cover 102 is firstly connected to the conductive member 30 via the sealant ring 50 in an insulated and sealed manner by heating and pressurizing, then the cell 20 is placed into the accommodating cavity of the bottom shell 101, and then the top cover 102 having the conductive member 30 is connected to the bottom shell 101 in a sealed manner by welding and the like. The abutment member 60 is inserted into the cell cavity 203 of the cell 20, with the first end of the abutment member 60 abutting against the first tab 201, and the second end of the abutment member 60 protruding out of the top cover 102, providing ease of handling for a user. With the first tab 201 being pressed against the inner bottom wall of the bottom shell 101 by the abutment member, the first tab 201 is welded to the bottom shell 101 by a welding device, and the second tab 202 on the cell 20 is electrically connected to the conductive member 30 by welding and the like. Then, the abutment member 60 is retracted, and the electrolyte solution is injected into the accommodating cavity through the liquid injection port 301. After the electrolyte solution is injected, the sealing member 40 covers the injection port 301, the sealing member 40 is connected to the injection port 301 in a sealed manner by bonding or welding, completing the assembly of the button cell.

Moreover, in the embodiment of the present disclosure, the first insulating rubber layer 70 is provided with the first through hole 701, the second insulating rubber layer 80 is provided with the second through hole 801, and the third insulating rubber layer 90 is provided with the third through hole 901, such that the abutment member can sequentially pass through the third through hole 901, the second through hole 801, the cell cavity 203 of the cell 20, and the first through hole 701 and abut against the first tab 201, simplifying the assembling of the button cell, and improving the operational reliability of the button cell.

In the button cell provided by the embodiment of the present disclosure, the conductive member is provided with the extension part protruding towards the accommodating cavity, with the first glue-overflow groove being formed between the extension part and the edge of the opening, containing the glue which overflows out of the sealant ring in the first glue-overflow groove. In this way, the glue which overflows out of the first glue-overflow groove can additionally seal the conductive member and the case, thereby improving the sealing performance of the button cell.

Example III

The examples of the present disclosure further provides an electronic device including an electronic device body and the button cell provided by Embodiment I, the button cell provides electrical energy for the electronic device body.

In that case, the structure and operating principle of the button cell have been described in detail in Embodiment I, and will not be repeated herein.

The electronic device provided by the present disclosure includes the electronic device body and the button cell which provides electrical energy for the electronic device body. In the button cell, a conductive member covers an opening of a top cover, and the top cover is connected to the conductive member via a sealant ring in an insulated and sealed manner. A cell is placed in an accommodating cavity of a bottom shell, with a first tab on the cell being welded to an inner bottom wall of the bottom shell. Then, the top cover having the conductive member is connected to the bottom shell in a sealed manner, and a second tab on the cell is electrically connected to the conductive member. An electrolyte solution is injected into the accommodating cavity via the liquid injection port of the conductive member. After the electrolyte solution is injected, the sealing member cover the liquid injection port, and the sealing member is connected to the liquid injection port in a sealed manner by bonding or welding, thereby improving the sealing performance of the button cell.

Various embodiments or implementations in the specification have been described in a progressive manner, with each embodiment focusing on the differences from other embodiments, and for the same or similar parts among various embodiments, cross-reference can be made to each other.

In the description of the specification, reference terms "an embodiment", "some embodiments", "illustrative embodiment", "example", "specific example" or "some examples" mean that specific features, structures, materials or characteristics described in conjunction with the embodiments or examples are included in at least one embodiment or example of the present disclosure. In the specification, the illustrative representations of the above terms do not necessarily refer to the same embodiment or example. Moreover, the described specific features, structures, materials or characteristics can be combined in any one or more embodiments or examples in a suitable manner.

Finally, it should be noted that: the above embodiments are only used to describe the technical solutions of the present disclosure, and do not limit the same. Although the present disclosure has been described in detail referring to the above-mentioned embodiments, those skilled in the art should understand that modifications can still be made to the technical solutions described in the above-mentioned embodiments, or equivalent substitutions can be made to some or all of the technical features therein; and these modifications or substitutions will not make the essentials of the corresponding technical solutions depart from the scope of the technical solutions in the embodiments of the present disclosure.

What is claimed is:

1. A button cell, comprising a case, a cell and a conductive member;
    wherein the case comprises a bottom shell, and a top cover connected to the bottom shell in a sealed manner, the bottom shell and the top cover enveloping and forming an accommodating cavity for accommodating the cell; the top cover is provided with an opening in communication with the accommodating cavity, the conductive member covers the opening, and is connected to the top cover through a sealant ring in an insulated and sealed manner;
    the conductive member is further provided with a liquid injection port for injecting an electrolyte solution into the accommodating cavity, the liquid injection port being covered with a sealing member which is connected to the liquid injection port in a sealed manner;
    the cell has a first tab and a second tab, the first tab being electrically connected to the case, and the second tab being electrically connected to the conductive member; and
    the conductive member is provided with an extension part which passes through the opening and extends into the accommodating cavity;
    the extension part extends along a radial direction of a central axis of the opening towards the central axis of the opening to form the liquid injection port, and the extension part is located above the second tab;
    the sealing member is in a sheet structure, is located above the liquid injection port, and does not pass through the liquid injection port.

2. The button cell of claim 1, wherein a first glue-overflow groove is formed between the extension part and an edge of the opening, and the width of the first glue-overflow groove along a radial direction of the cell is 0.1-3 mm.

3. The button cell of claim 1, wherein a first counter bore is arranged on an end of the liquid injection port facing away from the accommodating cavity, and the diameter of the first counter bore is greater than that of the liquid injection port; the first counter bore is in communication with the liquid injection port, and the sealing member is located in the first counter bore and is connected to the first counter bore in a sealed manner.

4. The button cell of claim 3, wherein the sealing member is welded to the first counter bore.

5. The button cell of claim 1, wherein a cell cavity is formed in the center of the cell, and the cell cavity, the case and the liquid injection port are arranged coaxially.

6. The button cell of claim 5, further comprising an abutment member located in, and arranged coaxially with, the cell cavity, with an end of the abutment member abutting against the first tab to press the first tab against an inner bottom wall of the bottom shell, wherein the cell is a wound-type cell.

7. The button cell of claim 5, wherein a first insulating rubber layer is arranged between a lower end surface of the cell and an inner bottom wall of the case, and the first insulating rubber layer is provided with a first through hole arranged coaxially with the cell cavity.

8. The button cell of claim 7, wherein the diameter of the first through hole is greater than that of the cell cavity.

9. The button cell of claim 7, wherein a third insulating rubber layer is arranged between the second tab and the top cover.

10. The button cell of claim 9, wherein the third insulating rubber layer is attached to an inner wall of the top cover, and a circumference of the third insulating rubber layer is smaller than a circumference of the top cover along the radial direction of the cell;
    the third insulating rubber layer is further provided with a third through hole arranged coaxially with the cell cavity, and a diameter of the third through hole is less than the radial dimension of the opening.

11. The button cell of claim 9, wherein the third insulating rubber layer is attached to a side of the second tab closer to the top cover, and a distance between an outer edge of the third insulating rubber layer and an axis of the cell is less than a distance between the opening and the axis of the cell along the radial direction of the cell.

12. The button cell of claim 7, wherein a concave weld mark is arranged on a surface of the first tab facing the cell, and the weld mark is located in an area corresponding to the first through hole and the cell cavity.

13. The button cell of claim 12, wherein an area on an outer bottom wall of the bottom shell corresponding to the weld mark is a smooth flat surface or a rounded surface.

14. The button cell of claim 12, wherein a depth of the weld mark is 20-200 μm; or, a height of the weld bump formed after welding is 10-120 μm.

15. The button cell of claim 5, wherein a second insulating rubber layer is arranged between an upper end surface of the cell and an inner top wall of the case, and the second insulating rubber layer is provided with a second through hole arranged coaxially with the cell cavity.

16. The button cell of claim 15, wherein the diameter of the second through hole is greater than that of the cell cavity.

17. The button cell of claim 1, wherein a second counter bore is arranged on the top cover, the conductive member is located in the second counter bore, with an upper surface of the conductive member being flush with an upper surface of the top cover.

18. The button cell of claim 17, wherein a second glue-overflow groove is formed between an outer edge of the conductive member and a side wall of the second counter bore, and the width of the second glue-overflow groove along the radial direction of the cell is 0.1-3 mm.

19. An electronic device comprising an electronic device body and the button cell of claim 1;
   wherein the button cell supplies electrical energy to the electronic device body.

* * * * *